H. J. EDEL.
PROCESS FOR PROVIDING METALLIC PINS WITH HEAD PLATES.
APPLICATION FILED JULY 20, 1911.
1,034,091.   Patented July 30, 1912.
FIG.1.
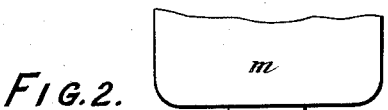
FIG.2.
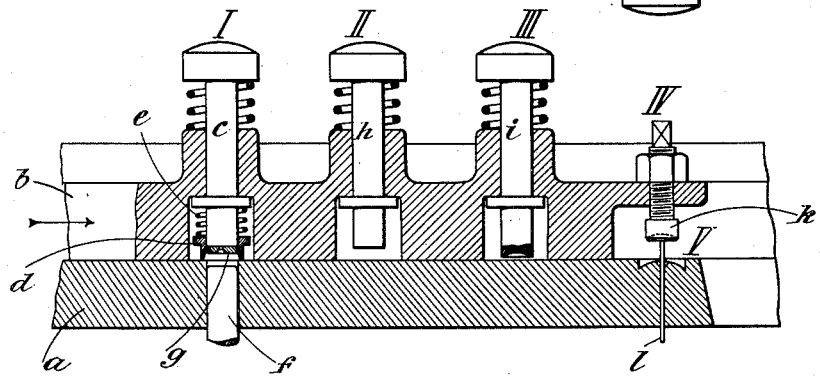
FIG.3.   FIG.4.   FIG.5.
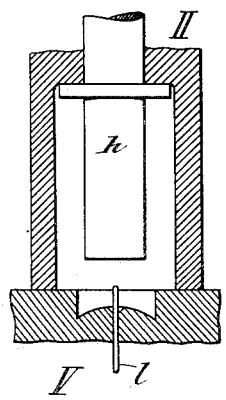 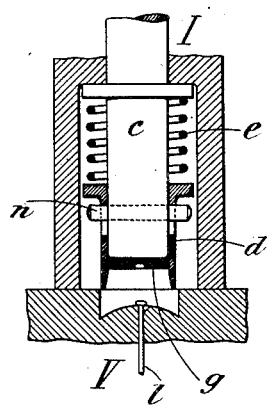 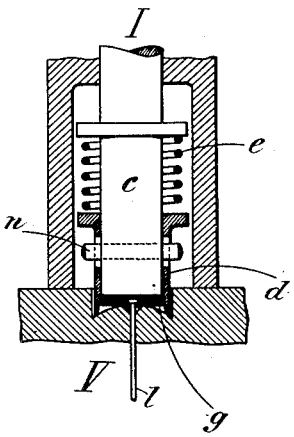
FIG.6.   FIG.7.
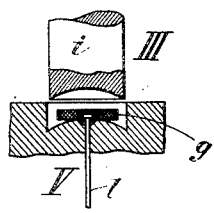 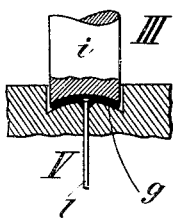
Witnesses:   Inventor
    Hermann J. Edel
by

UNITED STATES PATENT OFFICE.

HERMANN JOSEPH EDEL, OF NEHEIM-ON-THE-RUHR, GERMANY, ASSIGNOR TO GESELLSCHAFT FÜR MASCHINEN- UND METALL-INDUSTRIE MIT BESCHRANKTER HAFTUNG, OF NEHEIM-ON-THE-RUHR, GERMANY.

PROCESS FOR PROVIDING METALLIC PINS WITH HEAD-PLATES.

1,034,091.  Specification of Letters Patent.  Patented July 30, 1912.

Application filed July 20, 1911. Serial No. 639,658.

*To all whom it may concern:*

Be it known that I, HERMANN JOSEPH EDEL, engineer, a subject of the German Emperor, residing at Neheim-on-the-Ruhr, in the Kingdom of Prussia, Germany, have invented a certain new and useful Process for Providing Metallic Pins with Head-Plates, of which the following is a specification.

Drawing pins, carpet nails and similar fastening pins provided with wire heads are usually made by perforating the face of a head plate or forming a recess in such a plate, then placing the plate on the end of the pin and then riveting the plate to the pin by a strong blow, during which process as a rule the head plate also receives a slightly bulged shape. These known drawing pins, carpet nails and similar objects frequently have the defect, that the head-plate, even if it had been made exactly circular, and perforated or recessed exactly in the center, is not exactly circular or is slightly eccentric to the pin. In such cases the riveting is frequently insecure, especially if in the process of manufacture the end of the pin had been thickened by pressure and is situated in a recess of the plate, whose edges are pressed against the sides of the thickened extremity of the pin. According to the present invention this defect is avoided by first attaching the head-plate to the pin exactly in the center and in a plane precisely perpendicular to the same by a relatively slight blow or pressure, after which the two parts are riveted together by a stronger blow or stronger pressure and if desired, a slightly bulged or other required shape may be imparted to the plate. In either case the strong blow necessary for riveting is unable to change the correct position of the plate, which had been obtained by the preliminary attachment of the head-plate to the pin.

The present process is preferably performed in such a manner, that during the attachment of the plate to the pin the former is held or guided in a position exactly concentric to the pin.

The accompanying drawings serve to illustrate the new process, Figure 1 being a vertical section of a fastening pin, the head of which has in the center of its lower face a recess, with which it is mounted on the thickened extremity of a wire-pin, which is to be riveted to the plate by a suitable pressure or blow applied to the top of the plate, Fig. 2 is a vertical section of a reciprocating slide or carriage mounted on a bed plate and containing a series of dies or pressing tools to be used in the new process. Fig. 3 is a vertical section showing one of these tools on a larger scale, Figs. 4 and 5 are vertical sections showing another of the said tools in different stages of operation, Figs. 6 and 7 are vertical sections showing the third of the said tools, in different stages of operation.

As shown by Fig. 1, the plate mounted on the thickened extremity of the pin has a tendency to assume an inclined position. If that occurs, and the riveting by the descent of the known upper die or pressing tool takes place, the oblique plate is expanded or stretched on one side more than on the opposite side, moreover, the edges of the recess containing the extremity of the pin are pressed unequally against the sides of the pin, thus producing the defects mentioned above. This oblique position is prevented by attaching the plate to the pin by a slight blow or pressure at the time, when the plate is mounted on the pin. During this operation the plate is held in its correct position on the pin, preferably by holding or guiding its circumference with a sleeve serving to mount the plate on the pin.

As mentioned above, the part $b$ holding the individual tools is constructed as a carriage or slide, which is movable on a bed plate $a$ in the direction of the arrow Fig. 2, in order to place the tools I, II, III and IV consecutively over the anvil V in the bed-plate, where they perform their operations.

The tool I comprises a vertically movable driving pin or spindle $c$ resting with its head on a helical spring and carrying at its lower end a sleeve $d$ exposed to the pressure of a helical spring $e$, which tends to keep it in the lowest position. The head plate $g$ provided with a recess is placed on the end of the lower driving pin $f$, either by hand or by a suitable feed-mechanism, so that by the up-motion of the driving pin $f$ the plate $g$ will be introduced into the sleeve $d$ from below. The tool II consists of a driving pin $h$, whose head is likewise supported by a spring and which serves to apply an axial pressure to the extremity of the wire-pin, so as to form a head on the same, before it is introduced into the recess of the head-plate.
The tool III consists also of a spring-supported driving pin $i$, whose lower extremity is concave according to the desired shape of the head-plate. This driving pin serves to secure the head-plate firmly to the wire-pin by axial pressure, at the same time bulging the head-plate with the aid of a bulged anvil. The tool IV consists of an abutment $k$, preferably adjustable in height by means of a screw-thread and serving to limit the length of the pin, which has been provided with a head-plate and remains to be cut off, in such a manner, that after the finished pin has been cut off, the length of wire projecting above the anvil is sufficient for forming on the wire a head or thickened part by compression.

Fig. 2 shows a pin ready for being cut off, the said pin having been lifted by a suitable feed mechanism, until it meets the abutment $k$. The wire may be cut by any suitable means, by preference immediately above the edge of the bed-plate $a$, and so as to form at the same time a sharp point on the pin. This cutting process leaves a suitable length of wire projecting over the anvil (V), as shown in Fig. 3, without requiring for this purpose any feed motion of the wire. After the cutting of the wire, the slide $b$ is shifted, so as to place the tool II over the locality V (Fig. 3), where the driving pin $h$ receives a short blow from a hammer $m$, which rises and falls rapidly, thereby forming a head at the end of the wire, as indicated by Fig. 4.

Fig. 4 is a vertical section through the tool I situated over the working spot V. The sleeve $d$ capable of sliding on the driving pin $c$ holds the head plate $g$ at the circumference and deposits it on the head of the wire $l$, at the same time attaching the plate to the said head, as indicated above. For this purpose the sleeve $d$ may be adapted to slide on the driving pin $c$ and is held in its lowest position by the spring $e$. If the driving pin $c$ is caused to descend from the position indicated by Fig. 4 into the position indicated by Fig. 5, the sleeve $d$ is carried with it under the pressure of the spring $e$, whereby the head-plate $g$ is placed on the head of the wire $l$ and held in the correct position. At the same time the driving pin $c$ imparts to the plate $g$ a suitable pressure or blow, whereby the recess of the plate is slightly contracted, or the edge of this recess is slightly countersunk or depressed around the head of the wire and a temporary connection between the head plate and the wire is established. During this operation the head-plate $g$ is still held concentrically by the sleeve $d$. When the driving pin $c$ ascends, the sleeve $d$ is lifted by a suitable abutment, for instance a transverse pin or key $n$, and leaves the head-plate $g$ back on the wire $l$. This temporary attachment insures an exactly concentric and rectangular position of the plate $g$ with regard to the pin $l$, so that it is no longer possible for the plate $g$ to assume an oblique position, as indicated by Fig. 1 for the known process of manufacture, before the actual riveting takes place.

The driving pin $i$ situated over the place of operations V, as shown in Fig. 6, may now come into contact with the head-plate $g$ uniformly at all points, for the purpose of riveting and form a secure and uniform joint with the pin, during which operation the head-plate may also be shaped and expanded, in the manner indicated by Fig. 7.

Apparatus for carrying out the present process is covered by my co-pending application, Serial No. 639,659, filed of even date herewith.

What I claim is:—

1. A process of securing metallic pins to head plates which consists in applying a recessed head plate to a pin, and temporarily attaching the plate to the pin by applying pressure only to the recessed portion of the plate in immediate proximity to the pin, and finally riveting the plate permanently to the pin by a relatively heavier pressure.

2. A process of securing metallic pins to head plates which consists in applying a recessed head plate to a pin, applying pressure only to that part of the head plate which is recessed and immediately surrounds the pin, and permanently riveting the head plate to the pin and simultaneously shaping the head plate.

3. A process of securing metallic pins to head plates which consists in applying a recessed head plate to a pin, applying a relatively slight pressure only to the recessed portion of the head plate in immediate proximity to the pin, and then applying a relatively stronger pressure to the entire head plate to rivet it permanently to the pin and to expand and shape the head plate.

4. A process of securing metallic pins to head plates which consists in simultaneously mounting a recessed plate upon a pin and applying pressure to the recessed portion of the head plate of a strength just sufficient to temporarily attach the plate to the pin, and subsequently applying a relatively heavier pressure to the entire surface of the head plate to permanently rivet it to the pin.

5. A process of securing metallic pins to head plates which consists in mounting a recessed head plate on a pin, temporarily attaching the head plate to the pin by applying pressure solely to the recessed portion of the plate while the recessed head plate is held perpendicularly and concentrically with respect to the pin, and finally riveting the plate permanently to the pin.

6. A process of securing metallic pins to head plates which consists in placing a recessed head plate on a pin, temporarily attaching the recessed plate to the pin by applying pressure solely to the recessed portion of the plate while the head plate is held in centered position and perpendicularly to the axis of the pin, and finally applying pressure to the entire surface of the head plate to rivet the plate permanently to the pin.

7. A process of securing metallic pins to head plates which consists in thickening the end of a pin by axial pressure, placing a head plate on the pin with the thickened end of the latter engaging in a recess in the center of the head plate, and supporting the head plate by a convex anvil, pressing the head plate upon the anvil with a relatively light pressure solely upon that portion of the plate immediately surrounding the recess therein to force the peripheral edge of the recess in the head plate into engagement with the pin, thereby temporarily attaching the pin and head plate, and finally applying a heavier pressure to the entire area of the head plate to shape the latter and rivet the plate permanently to the pin.

8. A process of securing metallic pins to head plates which consists in temporarily attaching a head plate to a pin by a relatively light pressure upon only that portion of the plate which immediately surrounds the pin while the plate is held concentrically of the pin, releasing the hold on the plate, and finally applying a relatively stronger pressure to the entire area of the head plate to rivet the latter permanently to the pin and to expand and shape the head plate.

In testimony whereof I have hereunto set my hand in presence of two subscribing witnesses.

HERMANN JOSEPH EDEL. [L. S.]

Witnesses:
 ALFRED HENKEL,
 ALBERT F. NUFER.